F. MARKOE.
Balancing-Toy.
No. 167,771. Patented Sept. 14, 1875.
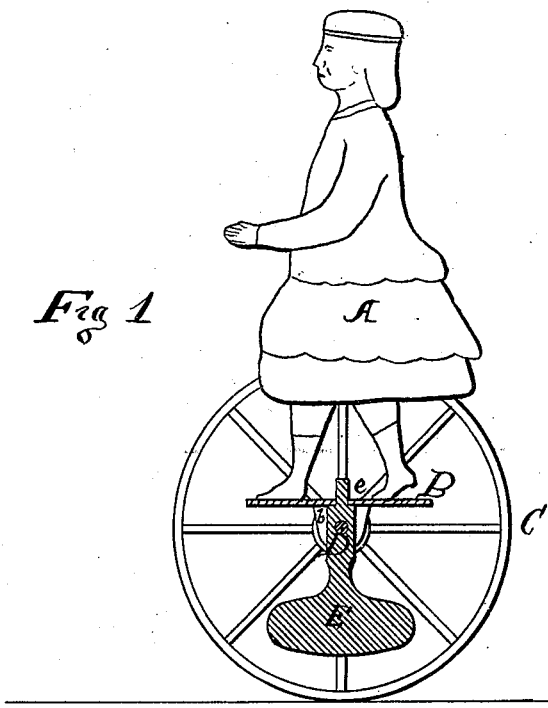
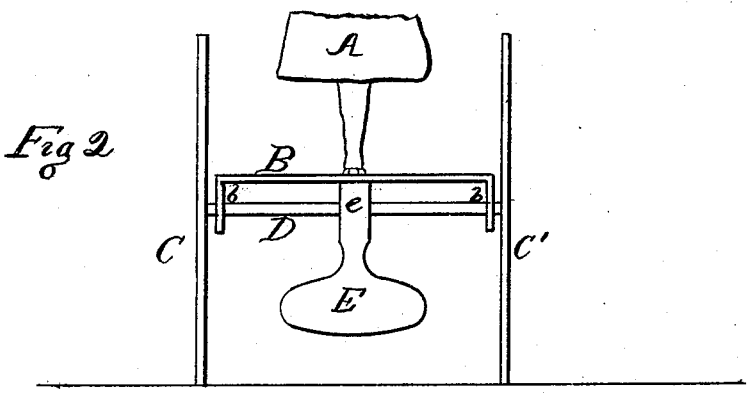

UNITED STATES PATENT OFFICE.

FREDRICK MARKOE, OF PHILADELPHIA, PENNSYLVANIA.

IMPROVEMENT IN BALANCING TOYS.

Specification forming part of Letters Patent No. 167,771, dated September 14, 1875; application filed August 4, 1875.

*To all whom it may concern:*

Be it known that I, FREDRICK MARKOE, of Philadelphia, in the county of Philadelphia and State of Pennsylvania, have invented certain new and useful Improvements in Balancing Toys; and I do hereby declare the following to be a full, clear, and exact description of the invention, such as will enable others skilled in the art to which it pertains to make and use it, reference being had to the accompanying drawings, which form part of this specification, in which—

Figure 1 is a vertical section, and Fig. 2 is a front view.

My invention has for its object to produce a simpler means than that heretofore practiced of fastening the weight to the stand of a balancing toy.

Prior to my invention it was customary to pass the axle of the wheels upon which the figure is mounted through a tin tube, to which the stand and the weight were soldered on opposite sides, the weight requiring, in such case, to be made of lead, so as to permit soldering. With my improvement I dispense with the tin tube or sleeve, and am able to employ an iron weight and avoid soldering.

A in the accompanying drawing represents a figure of any kind, and B the stand upon which it rests. C C' represent the wheels, and D the axle. E is an iron weight, having a neck or pin, $e$, which passes up through the stand B. Said stand is formed with ears $b\ b$, through which, and through the pin or shank $e$, the axle D passes.

To put the parts together, the pin $e$ is first inserted in the opening in the stand B. The axle D is then passed through the ears $b\ b$ and opening in the pin $e$. The wheel C' is then put upon the axle, (the wheel C being generally fast upon the latter,) and the structure is complete without soldering.

What I claim is—

1. In combination with the stand B of a balancing toy, the weight E, having a neck, $e$, for insertion in said stand, as shown and described.

2. The combination of the stand B, having ears $b\ b$, the weight E, having a neck, $e$, and the axle D, passing through said ears and neck, substantially as shown and described.

3. A balancing-weight, E, formed with a neck, $e$, for passing through a stand, and an opening for the passage of an axle, said weight and neck being cast or formed in one piece, substantially as and for the purpose shown and described.

In testimony that I claim the foregoing I have hereunto set my hand this 31st day of July, 1875.

FREDRICK MARKOE.

Witnesses:
M. DANL. CONNOLLY,
CHAS. F. VAN HORN.